Nov. 18, 1924.　　　　　　　　　　　　　　　1,515,809
H. C. ECKENROAD
LOCKING MEANS FOR AUTOMOBILE STEERING WHEELS
Filed June 23, 1921　　　2 Sheets-Sheet 1
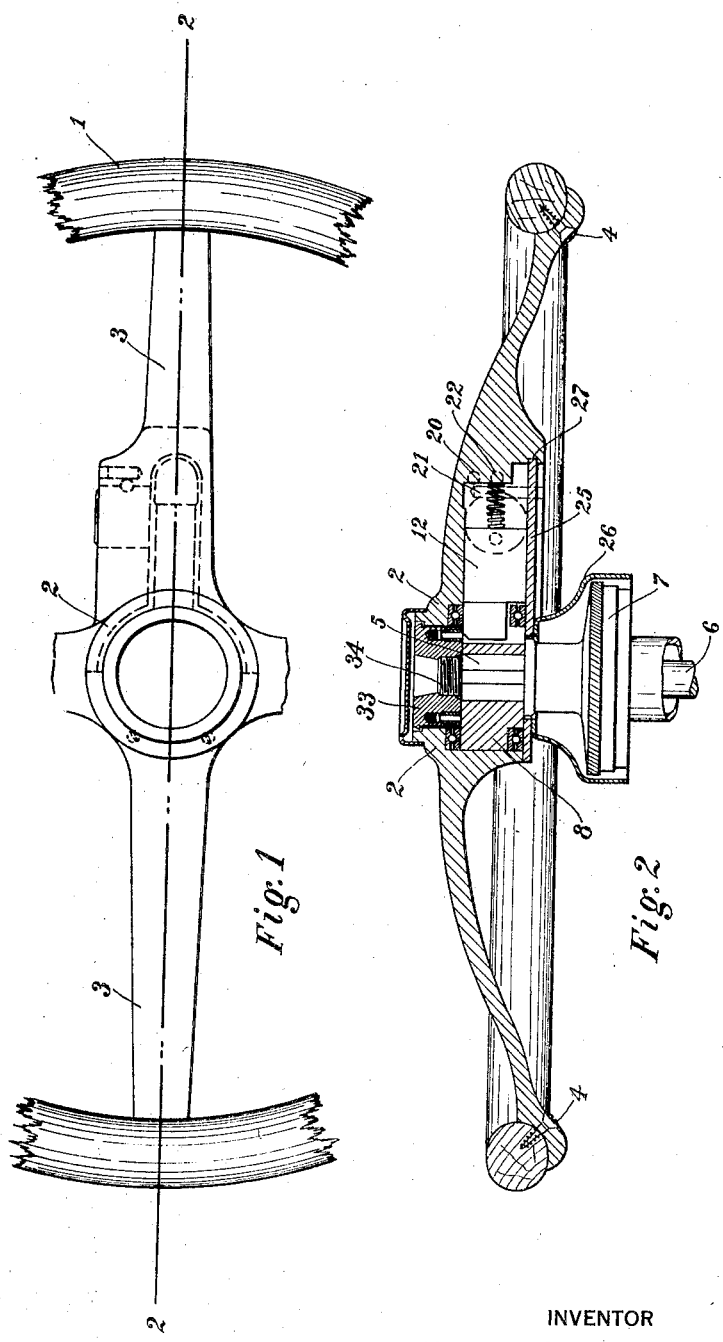
INVENTOR
HARVEY C. ECKENROAD
BY
ATTORNEYS Nov. 18, 1924.

H. C. ECKENROAD 1,515,809

LOCKING MEANS FOR AUTOMOBILE STEERING WHEELS

Filed June 23, 1921   2 Sheets-Sheet 2

INVENTOR
HARVEY C. ECKENROAD
BY
Richey Slough & Fales,
ATTORNEYS

Patented Nov. 18, 1924.

1,515,809

UNITED STATES PATENT OFFICE.

HARVEY C. ECKENROAD, OF ELYRIA, OHIO, ASSIGNOR TO THE SUPERIOR METAL PRODUCTS COMPANY, OF ELYRIA, OHIO, A CORPORATION OF OHIO.

LOCKING MEANS FOR AUTOMOBILE STEERING WHEELS.

Application filed June 23, 1921. Serial No. 479,950.

*To all whom it may concern:*

Be it known that I, HARVEY C. ECKENROAD, a citizen of the United States, residing at Elyria, in the county of Lorain and State of Ohio, have invented certain new and useful Improvements in Locking Means for Automobile Steering Wheels; and I do hereby declare the following to be a full, clear, concise, and exact description, such as will enable others skilled in the art to which it appertains to make and use the same.

My invention relates to locking means for automobile steering wheels, and particularly to such locking means as will prevent unauthorized persons steering the automobile, even though the steering wheel may be inoperatively locked by the authorized driver or owner thereof.

Many types of mechanisms for locking the steering wheel per se to the automobile steering post, so as to permit rotation of the post by the wheel, under the control of a key-operated lock, have been proposed, and some of them are now in use, such arrangements which operate, in my opinion, upon the best principle, being those wherein it is possible by the use of a key to disable the key means provided to prevent relative rotation of the steering wheel and steering post, and without any operative effect, so far as stealing the automobile is concerned.

Subsequent to the development and putting into public use of such key-operated locking mechanisms, it has been found that thieves are able by the means of a hack-saw, or like instrument, to saw away a portion of the steering wheel, such as one of the spokes thereof and adjacent the hub of the wheel sufficient to enable the thief to remove the key-operated lock per se bodily from the spoke, or to move it or some of its parts from their normal locking position to an inoperative position, whereupon the locking plunger operated by the lock per se may be manipulated by the thief so as to restore the ability of the wheel to steer the automobile.

Moreover, it has been found in practice that the clamping nut usually provided to secure such steering wheels to the steering post of an automobile is capable of being removed by such thieves, and efforts to prevent such removal have not been as successful as is desirable, since automobile thieves very commonly are high-class mechanics and possessed of no little skill and ingenuity; also, certain of the best arrangements for preventing the removal of the clamping nuts so far proposed, and with which I am familiar, are subject to the further deficiency that they are expensive for the manufacturer of the wheels to provide, and are very apt to get out of order, due to frictional effects, some of which are accumulative, during the use of the wheel.

It is an object, therefore, of my present invention to provide means preventing unauthorized access to the locking mechanisms per se, used particularly in this type of steering wheels, and it is a further object to prevent removal of such locks by unauthorized persons.

It is a further object in such means to provide the same in such form as may be as easily and inexpensively applied as possible, and at the same time be most efficient in performing their function.

Another object of my invention is to provide rugged, simple locking means for the steering post clamping nut, which may be provided inexpensively in connection with such clamping nuts with the minimum number of factory operations.

Another object of my invention is to provide such clamping nut locking means of the type described, in which the friction effects will be made very small, and will not be accumulative during the use of the same.

Other objects of the invention and the invention itself will be understood by reference to a specific embodiment thereof illustrated in the accompanying drawings, to which reference will be made in the description of the invention which follows:

Referring now to the drawings,

Fig. 1 is a plan view of a portion of an automobile steering wheel embodying the principles of my invention.

Fig. 2 is a sectional view on the line 2—2 of Fig. 1 of the steering wheel, other associated parts being shown in side elevation.

Figure 4:
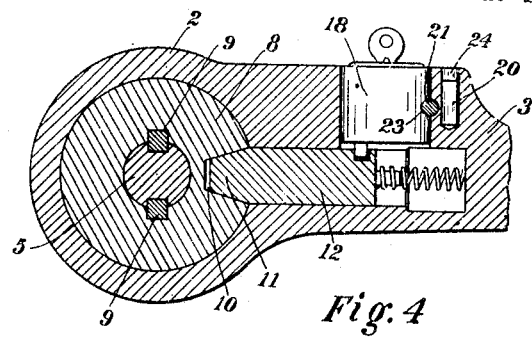
Fig. 4 is a horizontal section of the steering post and surrounding parts, together with the locking mechanism positioned as shown in Fig. 3, some of the locking mechanism parts being herein illustrated in plan.
Figure 3:
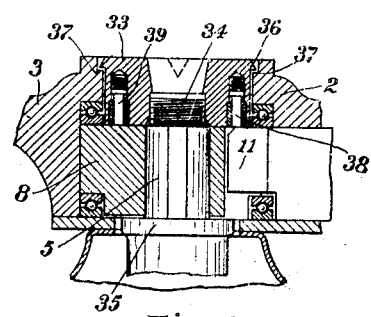
Fig. 3 is a side elevational view of the end of the steering post, the parts surrounding the post end being shown in section on the line 2—2 of Fig. 1. In this figure the lock plunger is shown in that position which it will assume when the steering wheel is operatively associated with the post for automobile driving purposes.
Figure 6:
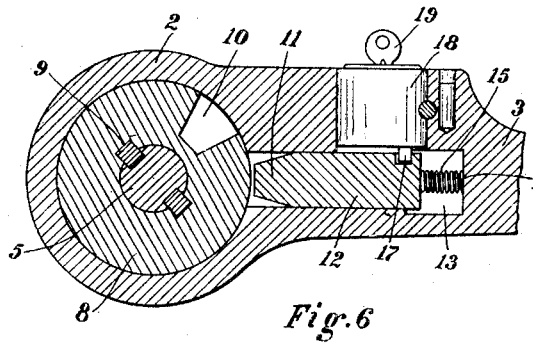
Figure 5:
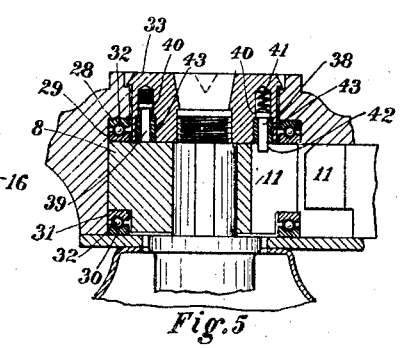

Figs. 5 and 6 illustrate the same parts, in the same views, as Figs. 3 and 4, respectively, except that in Figs. 5 and 6 the locking mechanism parts are shown in that position which they would assume when the lock has been operated to withdraw the plunger to such a position that the steering wheel and the steering post will be unlocked and the steering wheel will be incapable of rotating the steering post to operatively steer the automobile.

Figure 7:
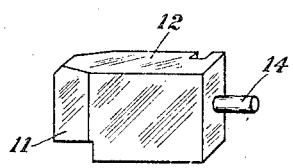

Fig. 7 is a perspective view of the lock plunger.

Figure 8:
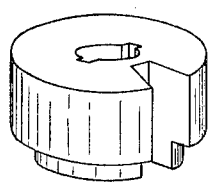

Fig. 8 is a perspective view of the steering post encircling ring or hub.

Figure 9:
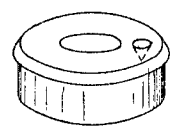

Fig. 9 is a perspective view of the steering post clamping nut.

Figure 10:
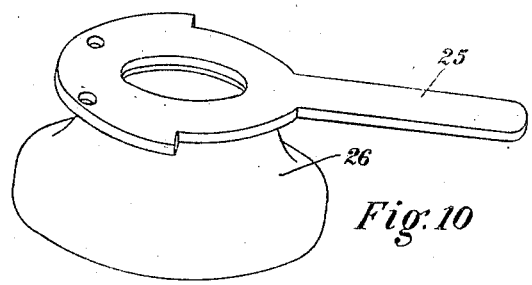

Fig. 10 is a perspective view of the steering gear enclosing case, together with attaching means therefor.

Referring now to the figures of the drawings, in all of which like parts are designated by like reference characters, at 1 I show a steering wheel rim or handle attached to a steering wheel hub 2 by spokes 3 radiating from the hub to the rim, and which rim is secured to the spokes by wood screws 4. The hub 2 encircles the end of a steering post 5, which steering post when rotated will cause the rotation of a steering shaft 6, the shaft 6 and the post 5 being inter-connected by a system of gears contained within a case 7, and which gear system is that commonly used in a Ford automobile. Encircling the end of the post 5 and between the post and the steering wheel hub 2 is an encircling ring or hub member 8, said hub member being permanently keyed to the steering post 5 by keys 9, so that the encircling ring or hub member 8 will rotate at all times with the steering post 5. The encircling ring or hub member 8 is peripherally notched at 10 at one or more points around its periphery, one point only being shown in the embodiment illustrated in the drawings. The steering wheel hub 2 from which radiate the steering wheel spokes 3 is adapted to be keyed to the steering post encircling ring or hub member 8 by means of an end 11 of a reciprocating locking plunger 12 entering the notch 10 of the hub member.

The end 11 of the plunger 12 is wedge-shaped, and the walls of the notch 10 are so formed as to admit the wedge-shaped end 11, and as illustrated in Fig. 4, it is preferable that the extreme end of the plunger 12 shall not reach the end of the notch 10. The plunger 12 is contained in a recess 13 in an enlarged portion of one of the spokes 3 terminating at its rear end in a rod 14, said rod 14 being encircled by an end of a spiral spring 15, said spring 15 having an end resting against the end wall 16 of the recess 13, the other end pressing against the plunger 12 to normally tend to press the plunger against the hub 8 and into the recess 10 thereof whenever the wheel is rotated, so as to present the plunger end 11 to the notch 10.

The plunger 12 is adapted to be reciprocated by means of a plunger operating pin 17 of a lock 18, which is preferably of the so-called Yale type, the lock 18 containing such well known locking mechanism as enables an operator by manipulating a removable key 19 to cause the pin 17 to move the plunger 11 forwardly into the notch 10, or rearwardly against the power of the spring 15 out of engagement with the said notch, so as to operatively lock the steering wheel to the steering post, or to operatively disassociate the steering wheel and steering post, as may be desired, the pin 17 when in the position illustrated in Fig. 6 holding the plunger 12 against the power of the spring 15.

The metallic portions of the steering wheel proper are commonly constructed of aluminum or other relatively soft metal and commonly cast into the desired shape, and expert thieves have heretofore devised ways whereby the lock proper, such as the lock 18, of prior constructions may be bodily removed from the steering wheel spoke 3, into which it is fitted, or the locking parts comprising a plunger corresponding to the plunger 12 may be manipulated by the would-be thieves sawing into the locking mechanism in various ways. I have in my improved steering wheel locking mechanism provided means consisting of the embedded hard steel rods 20, 21 and 22, which stand in the path of a hack saw blade or other instrument directed towards the lock, and being so hard will prevent further sawing toward the lock 18. The arrangement of these hard steel cylindrical rods 20, 21 and 22 is that which I have found best adapted for the purpose. I first notch the lock 18 at 23, the lock 18 then being fitted into place in the steering wheel spoke 3 by driving it into the recess provided for the purpose. The spoke is drilled so that a circular hole is provided through which the hard steel rod 21 may be driven, the hole being of such size that there will be provided only a drive fit for the rod 21, the hole comprising in part the semicircular groove 23 on the side of the lock 18. This steel rod 21 effectually keys the lock 18 in position, so that it may not be bodily withdrawn from the wheel. The rods 20 and 22 are then placed within the holes first drilled into the steering wheel spoke in a direction at right angles to the hole which accommodates the rod 21, these steel rods also being tightly fitted within the steering wheel so as to prevent successive efforts at removal. The rods 20 are driven below the surface of the steering wheel spokes and the space left above them, such as the space 24, for the rod 20 is filled up by a plug of aluminum and the surface fenced off so that a close observer would not be able to detect the end of the plug 24.

The tongue 25 of the bell-shaped gear cover 26 is adapted to be fitted below the plunger 12, so as to close the bottom of the recess which contains the plunger 12, the tongue 25 fitting within a groove 27 which encloses its margins. The tongue 25 is also preferably of hardened steel and its position insures that it will not be visible so as to avert an unpleasant appearance to the eye, due to its being constructed of steel instead of aluminum as are the other adjacent exposed parts.

Ball bearings, comprising upper race members 28 and 29 and lower race members 30 and 31 with intervening bearing balls 32 are provided for the purpose of insuring that there will be little friction between the steering wheel and steering post encircling hub member 8 when the steering wheel and the post are operatively disassociated for preventing steering of the automobile by the steering wheel, as when the owner leaves his car unattended. This insures that the wheel may spin freely on the post and there will be no binding between the wheel and the post, even when the wheel is tilted in one direction or the other by manual force applied for the purpose. The clamping nut 33 is threaded on to the threaded end 34 of the steering post 5 and its lower bearing surface clamps the steering post encircling hub member 8 on the post 5 and between the lower bearing surface of the nut 33 and the upper surface of a flange 35 of the steering post. The clamping nut 33 therefore retains the steering wheel in position on the post, and for the purpose of preventing removal of the steering wheel I have so constructed and arranged the clamping nut that when the steering wheel is left in inoperative steering condition one cannot turn the clamp nut 33 to remove it. This is not broadly new with me, but I have accomplished this purpose in a more practical way than has heretofore been done.

The clamping nut is provided at its upper peripheral portion with a flange 36, the flange overlying a shoulder 37 in the part of the steering wheel hub 2. This is an additional means provided in my construction, whereby the steering wheel may not be removed as long as the nut 33 is in position.

The nut 33 is prevented from being rotated to turn it off the threads 34 of the steering post 5 by the provision of hard steel spring pressed points 38 and 39 positioned within individual recesses extending from the underside of the clamping nut, so that one or the other of them will, when the plunger is withdrawn from that operative position where the steering wheel is locked to the position 5, project downwardly into the notch 10 of the post encircling ring or hub member 8. This condition is illustrated in Fig. 5, where it will be seen that the steel plunger 38 having a flanged head 40 is pressed by the spiral spring 41 downwardly so that its end 42 extends within the notch 10 of the post encircling ring or hub member 8, so as to prevent relative rotation of the nut 33 and the post 5 upon which it is threaded. This effectually prevents removal of the clamping nut. In order to insure at all times that the pins 38 and 39 will be maintained in correct alignment, and that there will be a minimum of friction opposing the longitudinal reciprocating movement of the pins, I provide bearings 43 of considerable length into which the pins are journalled, the pins being of considerable diameter and fitting closely in the journals.

The underside of the flanged heads of the pins is adapted to rest on the top edges of the cylindrical journals when the pins, such as the pin 38 (Fig. 5) are projected downwardly into the hub member notch 10. It will be noted that the recesses containing the pins, springs and journals are drilled all from the underside of the nut, the recesses being drilled in several portions of successively lessening diameter, so as to contain the journals, the heads of the pins and the spring, and that the holes drilled to provide these recesses are only part way through the nut and do not extend through to the upper outside surface of the nut 33.

In prior constructions providing nut locking pins of this general character it has been necessary to drill through the nut 33, perforating the upper surface thereof, and even though such upper surface drilling is filled with small cylindrical plugs, still in a steel nut, such as the nut 33, it is almost impossible to entirely conceal such plugs, and when removed in some constructions the pins are removable through the openings thus provided. In the nut construction of my invention the presence of the pins is entirely concealed and is not suggested and their positioning is likewise unsuggested by the external appearance of the nut. The journals 43 are driven very tightly into the cylindrical recesses provided to receive them.

Having thus described my invention in its several phases as embodied in a steering wheel construction of particular design, I wish it to be understood that numerous and extensive departures may be made from the embodiment herein illustrated and described for the purpose of describing my invention, but without departing from the spirit thereof.

What I claim as my invention is:

1. In an automobile steering wheel, a rim, a hub, spokes interconnecting the rim and hub, a locking mechanism secured to the hub comprising a plunger, locking means to reciprocate the plunger towards and away from the axis of rotation of the steering wheel, a steering wheel post, a metallic band or ring around the post and non-rotatably secured thereto, said ring having a longitudinal notch on its periphery, said plunger being adapted to project within the notch in said ring to inter-lock a steering wheel spoke and the said post, screw threads on the upper end of the said post, a clamping nut adapted to be secured to the said post by the said threads and adapted when so secured to clamp the steering wheel on the said post and to prevent removal therefrom, said nut having an upwardly extending recess extending from the lower surface thereof and only partially therethrough, a cylindrical journal tightly fitted within the lower portion of the recess in said nut, a pin projecting through a longitudinal opening in the said journal and adapted to reciprocate through the said opening, said pin having an enlarged head projecting above the end of the cylindrical journal, and a spiral spring disposed in the upper portion of the recess and adapted to press downwardly upon the head of the pin, said pin being thus spring pressed against the top surface of the lock plunger when the lock plunger is adjusted to extend within the longitudinal notch in said ring, and said pin being adapted to be projected within the notch in said ring by the pressure of the said spring when the lock plunger is withdrawn from the notch in said ring, said pin being adapted thereupon to have the intra-peripheral portion of the underside of its hub rest on an upper edge of the said cylindrical journal.

2. In an automobile steering wheel, a rim, a hub, spokes interconnecting the rim and hub, a locking mechanism secured to the hub comprising a plunger, locking means to reciprocate the plunger towards and away from the axis of rotation of the steering wheel, a steering wheel post, a metallic band or ring around the post and non-rotatably secured thereto, said ring having a longitudinal notch on its periphery, said plunger being adapted to project within the notch in said ring to inter-lock a steering wheel spoke and the said post, screw threads on the upper end of the said post, a clamping nut adapted to be secured to the said post by the said threads and adapted when so secured to clamp the steering wheel on the said post and to prevent removal therefrom, said nut having an upwardly extending recess extending from the lower surface thereof and only partially therethrough, a cylindrical journal tightly fitted within the lowermost portion of the recess, a pin projecting through a longitudinal opening in the said journal and adapted to reciprocate through the said opening, said pin having an enlarged head projecting above the end of the cylindrical journal, and a spiral spring disposed in the upper portion of the recess and adapted to press downwardly upon the head of the pin, said pin being thus spring pressed against the top surface of the lock plunger when the lock plunger is adjusted to extend within the longitudinal notch in said ring, and said pin being adapted to be projected within the notch in said ring by the pressure of the said spring when the lock plunger is withdrawn from the notch in said ring, said pin being adapted thereupon to have the intra-peripheral portion of the underside of its hub rest on an upper edge of the said cylindrical journal, said plunger having the end of its upper surface so inclined that when the plunger is again reciprocated toward the axis of rotation of the wheel and re-enters the longitudinal notch in said ring the end of the said pin will be engaged and the pin lifted from the notch.

3. In an automobile steering wheel, a rim, a hub, spokes interconnecting the rim and hub, a locking plunger, a metallic ring around the post non-rotatably secured thereto, said ring having a notch therein, locking means to reciprocate the plunger within the notch in said ring to inter-lock a steering wheel spoke and the said post, screw threads on the upper end of the said post, a clamping nut adapted to be secured to the said post by the said threads and adapted when so secured to clamp the steering wheel on the said post and to prevent removal therefrom, said nut having a pair of recesses comprising stepped cylindrical portions of successively lesser diameter, each projecting from the bottom surface towards the upper surface thereof, but not projecting therethrough, and each having a hollow cylindrical journal fitted tightly in the largest portion, a pin projecting through the hollow portion of the journal and fitted closely to the walls thereof, said pin having an enlarged flanged head, the underside of the said head being adapted to rest against the upper end of the journal, and a spring adapted to exert downward pressure upon the head of the pin, said nut being turned on the post so that one of the pins is so placed as to project its end within the notch in said metallic ring when the plunger is withdrawn therefrom.

4. In an automobile steering wheel, a rim, a hub, spokes interconnecting the rim and hub, a locking plunger, a metallic ring around the post non-rotatably secured thereto, said ring having a notch therein, locking means to reciprocate the plunger within the notch in said ring to inter-lock a steering wheel spoke and the said post, screw threads on the upper end of the said post, a clamping nut adapted to be secured to the said post by the said threads and adapted when so secured to clamp the steering wheel on the said post and to prevent removal therefrom, said nut having a pair of recesses comprising stepped cylindrical portions of successively lesser diameter, each projecting from the bottom surface towards the upper surface thereof, but not projecting therethrough, and each having a hollow cylindrical journal fitted tightly in the largest portion, a pin projecting through the hollow portion of the journal and fitted closely to the walls thereof, said pin having an enlarged flanged head, the underside of the said head being adapted to rest against the upper end of the journal, and a spring adapted to exert downward pressure upon the head of the pin, said nut being turned on the post so that one of the pins is so placed as to project its end within the notch in said metallic ring when the plunger is withdrawn therefrom, said plunger having the end of its upper surface so inclined that when the plunger is again reciprocated toward the axis of rotation of the wheel and re-enters the longitudinal notch in said ring the end of the said pin will be engaged and the pin lifted from the notch.

5. In an automobile steering wheel, a lock for said steering wheel, said lock being adapted to render the steering wheel operative or inoperative as desired, said steering wheel comprising a rim, a hub and spokes interconnecting the rim and hub, said lock being disposed in a recess provided in one of the spokes, said spoke being constructed of relatively soft metal, and provided with a transverse notch on a side of the lock, said spoke having a hole drilled therein, the notch in said spoke forming a portion of a wall of the drilled hole, and a hardened steel cylindrical rod tightly fitted in the said hole, said hardened steel rod being adapted to prevent removal of the lock by keying the lock within its recess and at the same time serving as an impediment to sawing through the relatively soft metal spoke towards the lock in an effort to remove the lock.

6. In an automobile steering wheel, a lock for said steering wheel, said lock being adapted to render the steering wheel operative or inoperative as desired, said steering wheel comprising a rim, a hub and spokes interconnecting the rim and hub, said lock being disposed in a recess provided in one of the spokes, said spoke being constructed of relatively soft metal and having a hole drilled therein, said lock having a transverse notch on one side the notch in said lock forming a portion of a wall of the drilled hole in said spoke, a hardened steel cylindrical rod tightly fitted in the hole between said spoke and said lock, said hardened steel rod being adapted to prevent removal of the lock by keying the lock within its recess and at the same time serving as an impediment to sawing through the relatively soft metal spoke towards the lock in an effort to remove the lock, said rod being submerged below the surface of the spoke, and a relatively short cylindrical plug of the same metal as the spoke to seal the drilled hole at the surface.

7. In an automobile steering wheel, a lock for said steering wheel, said lock being adapted to render the steering wheel operative or inoperative as desired, said steering wheel comprising a rim, a hub and spokes interconnecting the rim and hub, said lock being disposed in a recess provided in one of the spokes, said spoke being constructed of relatively soft metal and having a hole drilled therein, said lock having a transverse notch on a side thereof the notch in said lock forming a recess with the drilled hole of the spoke, a hardened steel cylindrical rod tightly fitted in the said recess, said hardened steel rod being adapted to prevent removal of the lock by keying the lock within its recess and at the same time serving as an impediment to sawing through the relatively soft metal spoke towards the lock in an effort to remove the lock, and a plurality of other cylindrical rods likewise disposed in drilled holes in the spoke, but disposed at right angles to the first rod within the spoke and being more remote from the lock.

8. In an automobile steering wheel, a lock for said steering wheel, said lock being adapted to render the steering wheel operative or inoperative as desired, said steering wheel comprising a rim, a hub and spokes interconnecting the rim and hub, said lock being disposed in a recess provided in one of the spokes, said spoke being constructed of relatively soft metal and having a hole drilled therein, said lock having a transverse notch on a side thereof the notch in said lock forming a recess with the drilled hole in said spoke, a hardened steel cylindrical rod tightly fitted in the said recess, said hardened steel rod being adapted to prevent removal of the lock by keying the lock within its recess and at the same time serving as an impediment to sawing through the relatively soft metal spoke towards the lock in an effort to remove the lock, and a plurality of other cylindrical rods likewise disposed in drilled holes in the spoke, but disposed at right angles to the first rod within the spoke and being more remote from the lock, all of said rods being so short as to be submerged below the surface of the spoke, and plugs for the shallow recesses thus produced, said plugs being of the same metal as the spoke, the spoke surface and the surface of the plugs being alike finished together as one surface.

In witness whereof, I have hereunto signed my name this 15th day of June, 1921.

HARVEY C. ECKENROAD.